(12) United States Patent
Maarhuis

(10) Patent No.: US 11,919,578 B2
(45) Date of Patent: Mar. 5, 2024

(54) MOVABLE WING/AEROFOIL ASSEMBLY

(71) Applicant: SHIFT WINGS LIMITED, Lower Hutt (NZ)

(72) Inventor: Nicholas Gerard Maarhuis, Lower Hutt (NZ)

(73) Assignee: SHIFT WINGS LIMITED, Lower Hutt (NZ)

(*) Notice: Subject to any disclaimer, the term of this patent is extended or adjusted under 35 U.S.C. 154(b) by 1482 days.

(21) Appl. No.: 16/300,577

(22) PCT Filed: May 12, 2016

(86) PCT No.: PCT/NZ2016/050076
§ 371 (c)(1),
(2) Date: Nov. 11, 2018

(87) PCT Pub. No.: WO2017/196186
PCT Pub. Date: Nov. 16, 2017

(65) Prior Publication Data
US 2019/0389517 A1    Dec. 26, 2019

(51) Int. Cl.
*B62D 35/00* (2006.01)
*B62D 37/02* (2006.01)

(52) U.S. Cl.
CPC .......... *B62D 35/007* (2013.01); *B62D 37/02* (2013.01)

(58) Field of Classification Search
CPC ........ B62D 35/007; B62D 37/02; Y02T 10/82
See application file for complete search history.

(56) References Cited

U.S. PATENT DOCUMENTS

| | | | |
|---|---|---|---|
| 6,672,651 B1* | 1/2004 | Shuen ................. | B62D 35/007 296/180.1 |
| 7,322,638 B2* | 1/2008 | Larson ................ | B62D 35/007 296/180.1 |
| 7,438,347 B2* | 10/2008 | Froeschle ........... | B62D 35/007 296/180.1 |
| 9,403,564 B1* | 8/2016 | Al-Huwaider ....... | B60G 99/00 |
| 2012/0091752 A1* | 4/2012 | Algermissen ........ | B60J 7/22 296/180.1 |

FOREIGN PATENT DOCUMENTS

| | | | | |
|---|---|---|---|---|
| CN | 103847817 A | * | 6/2014 | .......... B62D 35/007 |
| DE | 102012111849 A1 | * | 6/2014 | .......... B62D 35/007 |
| WO | WO-2017196186 A1 | * | 11/2017 | .......... B62D 35/007 |

* cited by examiner

*Primary Examiner* — Lori Lyjak
(74) *Attorney, Agent, or Firm* — INVENTA CAPITAL PLC

(57) ABSTRACT

A movable wing assembly has a wing capable of moving laterally (left or right) on a vehicle as the vehicle is being driven such the positioning of the wing on the assembly corresponds to the optimum or desired downforce required by the vehicle for the driving action undertaking by the vehicle at that time, e.g. if cornering to the left the wing is positioned to the left on the assembly or if cornering to the right the wing is positioned to the right on the assembly or if driving straight the wing is positioned midway on the assembly. The wing is attached to a carriage moveable on a elongate beam mounted to a vehicle such that the wing is able to move relative to the vehicle as the vehicle is moving.

15 Claims, 5 Drawing Sheets

MOVABLE WING/AEROFOIL ASSEMBLY

FIELD OF THE INVENTION

The invention relates to a movable wing/aerofoil assembly for shifting where and how much downforce is exerted on a moving vehicle. The movable wing/aerofoil enables dynamic adjustment of the position and magnitude of aerodynamic downforce on a moving vehicle, for the purpose of improving the performance of the vehicle.

BACKGROUND OF INVENTION

Fixed aerodynamic devices (such as "wings", "aerofoils" and other similar devices) on vehicles generally do not allow dynamic adjustment for different conditions (such as changes in speed or compensating for cornering effects) as the vehicle is moving.

Current and previous solutions to the problem have primarily been achieved by adjusting the height and/or angle of the wing element, as well as splitting the wing into two halves and individually controlling the angle of each half during cornering (for example as early as the 1960's on the Nissan R381 race car). This system has both pros and cons to the design, so is simply a different approach to addressing the problem, rather than necessarily being a "worse" solution. Wings that raise and lower typically add a lot of weight to the vehicle, due to the hydraulic (or other) actuators required (such as in the Ferrari LaFerrari, Bugatti Veyron, McLaren P1, Porsche Carrera GT, and other such supercars utilising similar systems). Many patents exist for wings that change angle and/or move up/down. Other solutions exist, as per U.S. Pat. No. 6,575,522 Movable spoilers, U.S. Pat. No. 4,810,022 Adjustable angle spoiler and U.S. Pat. No. 8,798,868 Active aerodynamic devices to limit yaw/roll.

The current and previous solutions have aerodynamic devices that are either fixed to the vehicle and/or do not move as the vehicle moves (i.e. the position of the aerodynamic device remains static as the vehicle moves). Aerodynamic devices on vehicles cause drag and the downforce increases exponentially with speed, so at very high speeds, they can both restrict acceleration and also overload the tyres and/or suspension with too much downforce. The current and previous solutions are able to effectively compensate or adjust the drag and downforce as the vehicle increases in speed.

None of the current or previous solutions have an aerodynamic device where the lateral position of that aerodynamic device is able to be manipulated so that the magnitude and location of the aerodynamic down-force can be adjusted for different scenarios (such as increasing the traction on an "inside" wheel during cornering, to counter the reduced traction from weight-transfer), as well as enabling the amount of both the down-force and the aerodynamic drag to be altered for optimum results.

PRIOR REFERENCES

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications may be referred to herein; this reference does not constitute an admission that any of these documents form part of the common general knowledge in the art, in New Zealand or in any other country.

Definitions

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

OBJECT OF THE INVENTION

It is an object of the invention to provide a movable wing/aerofoil assembly that ameliorates some of the disadvantages and limitations of the known art or at least provide the public with a useful choice.

SUMMARY OF INVENTION

In a first aspect the invention resides in a movable wing/aerofoil assembly for shifting where and how much downforce is exerted on a moving vehicle, the wing/aerofoil assembly includes:
  a) a wing/aerofoil;
  b) a carriage connected to and supporting the wing/aerofoil; and
  c) a carriage support adapted to allow the carriage to move along the carriage support, the carriage support is mounted and positioned on a vehicle such that the carriage is able to move laterally relative to the longitudinal extent of the vehicle,
wherein the movable wing/aerofoil assembly allows the wing/aerofoil to move laterally relative to the vehicle as the vehicle is being driven such that the lateral movement and positioning of the wing/aerofoil on the vehicle corresponds to the optimum or desired aerodynamic downforce required by the moving vehicle and allows for the dynamic adjustment of the position and magnitude of aerodynamic downforce applied to the vehicle relative to the direction the vehicle is moving.

In a second aspect the invention resides in a movable wing/aerofoil assembly for shifting where and how much downforce is exerted on a moving vehicle, the wing/aerofoil assembly is mounted to a vehicle and includes:
  a) a wing/aerofoil; and
  b) a moveable carriage connected to and supporting the wing/aerofoil, the moveable carriage is adapted to move laterally relative to the longitudinal extent of the vehicle;
wherein the movable wing/aerofoil assembly allows the wing/aerofoil to move laterally relative to the vehicle as the vehicle is being driven such that the lateral movement and positioning of the wing/aerofoil on the on the vehicle assembly corresponds to the optimum or desired aerodynamic downforce required by the moving vehicle and allows for the dynamic adjustment of the position and magnitude of aerodynamic downforce applied to the vehicle relative to the direction the vehicle is moving.

Preferably, the wing/aerofoil is spaced and supported a distance above the carriage.

Preferably, moveable wing/aerofoil assembly is mounted at and above the rear of the vehicle such that the wing/aerofoil is spaced a distance above the rear of the vehicle so that airflow can be directed over and under the wing/aerofoil as the vehicle moves in order to apply aerodynamic downforce to the moving vehicle.

Preferably, the wing/aerofoil moveable wing/aerofoil assembly is mounted to and above the boot portion of the vehicle.

Preferably, the carriage is adapted to move freely laterally under its own gravity and inertia corresponding to the action of the moving vehicle.

Preferably, the carriage is adapted to move by use of weights and/or spring arrangements in order to control the direction and speed of the carriage corresponding to action of the moving vehicle.

Preferably, the carriage is adapted to move by way of a drive mechanism that in order to control the direction and speed of the carriage corresponding to action of the moving vehicle.

Preferably, the drive mechanism is motorised, preferably by an electric motor controlled by a processor such that the speed and direction that the carriage moves is determined by information provided to the processor by way of sensors and preprogramed variables associated with what the vehicle is experiencing in respect of vehicle speed, lateral movement, acceleration, downward force, drag, tyre loading as the vehicle is moving.

Preferably, the wing/aerofoil includes a left portion and a right portion where each portion is able to move independently to the other portion.

Preferably, the carriage includes a left carriage portion and a right carriage portion where each portion is able to move independently to other portion, the left carriage portion is connected to and supports the left portion of the wing/aerofoil and the right carriage portion is connected to and supports the right portion of the wing/aerofoil.

In a third aspect the invention resides in a method for shifting where and how much downforce is applied and exerted to a moving vehicle by a movable wing/aerofoil assembly, the method includes:
 a) mounting a moveable wing/aerofoil assembly as defined in the first or second aspects;
 b) positioning the wing/aerofoil in a mid-position on the moveable wing/aerofoil assembly such that the wing/aerofoil is centred on and above the vehicle when the vehicle is stationary and moving in a straight direction;
 c) moving the wing/aerofoil laterally to the left of the mid position when the vehicle is cornering to the left; and
 d) moving the wing/aerofoil laterally to the right of the mid position when the vehicle is cornering to the right,
wherein the movement and position of the wing/aerofoil on the vehicle corresponds to the optimum or desired aerodynamic downforce required by the moving vehicle and to allow for the dynamic adjustment of the position and magnitude of aerodynamic downforce applied to the vehicle relative to the direction the vehicle is moving.

In a fourth aspect the invention resides in a movable wing/aerofoil assembly for shifting where and how much downforce is exerted on a moving vehicle, the wing/aerofoil assembly is mounted to a vehicle and includes:
 a) a left wing/aerofoil and a right wing/aerofoil; and
 b) a left carriage and a right carriage, the left carriage connected to and supporting the left wing/aerofoil and the right carriage connected to and supporting the right wing/aerofoil and the right carriage, the carriages are adapted to move laterally relative to the longitudinal extent of the vehicle, the carriages are adapted and capable of moving in unison in the same laterally direction and are adapted and capable of moving independently and in opposite lateral directions;
wherein the movable wing/aerofoil assembly allows the wing/aerofoils to move laterally relative to the vehicle as the vehicle is being driven such that the lateral movement and positioning of the wing/aerofoils on the vehicle corresponds to the optimum or desired aerodynamic downforce required by the moving vehicle and allows for the dynamic adjustment of the position and magnitude of aerodynamic downforce applied to the vehicle relative to the direction the vehicle is moving.

In a fifth aspect the invention resides in a method for shifting where and how much downforce is applied and exerted to a moving vehicle by a movable wing/aerofoil assembly, the method includes:
 a) mounting a moveable wing/aerofoil assembly as defined in the fourth aspect;
 b) positioning the wing/aerofoils in a mid-position on the moveable wing/aerofoil assembly such that the wing/aerofoils are centred on and above the vehicle when the vehicle is stationary and moving in a straight direction;
 c) positioning one of the wing/aerofoils fully to the left of the mid position and positioning the other wing/aerofoil fully to the right of the mid when the vehicle moving in a straight direction and when full aerodynamic downforce mode is required;
 d) moving the left wing/aerofoil laterally to the left of the mid position and keeping the right wing/foil in the mid position when the vehicle is cornering to the left; and
 e) moving the right wing/aerofoil laterally to the right of the mid position and keeping the left wing/aerofoil in the mid position when the vehicle is cornering to the right,
wherein the movement and position of the wing/aerofoils on the vehicle corresponds to the optimum or desired aerodynamic downforce required by the moving vehicle and to allow for the dynamic adjustment of the position and magnitude of aerodynamic downforce applied to the vehicle relative to the direction the vehicle is moving.

Preferably, the wing/aerofoil assembly is adapted to be stowed within the vehicle bodywork such that the wing/aerofoil assembly is able to be stowed when zero or low drag for high speed and efficiency is required and is able to move progressively outwardly from the stowed position into the airflow of a moving vehicle when an adjustable amount of downforce is required.

Preferably, the wing/aerofoil assembly is adapted to be moved in and out of the airflow of a moving vehicle such that when zero or low drag for high speed and efficiency is required the wing/aerofoil assembly is moved out of the airflow of the moving vehicle and when an adjustable amount of downforce is required the wing/aerofoil is moved progressively into the airflow of the moving vehicle.

Preferably, the movement wing/aerofoil assembly can be mounted at and on any location on the vehicle such that the wing/aerofoil is postionable within the in and out of the airflow of the moving vehicle. Preferably, the longitudinal length of wing/aerofoil can be extended so that the longitudinal length of the wing/aerofoil when fully extended is greater than the width of the vehicle such that portions of the wing/aerofoil are positionable within the airflow passing along the side of the moving vehicle.

Any other aspects herein described

BRIEF DESCRIPTION

The invention will now be described, by way of example only, by reference to the accompanying drawings.

DESCRIPTION OF THE PREFERRED EMBODIMENT(S)

Figure 1:
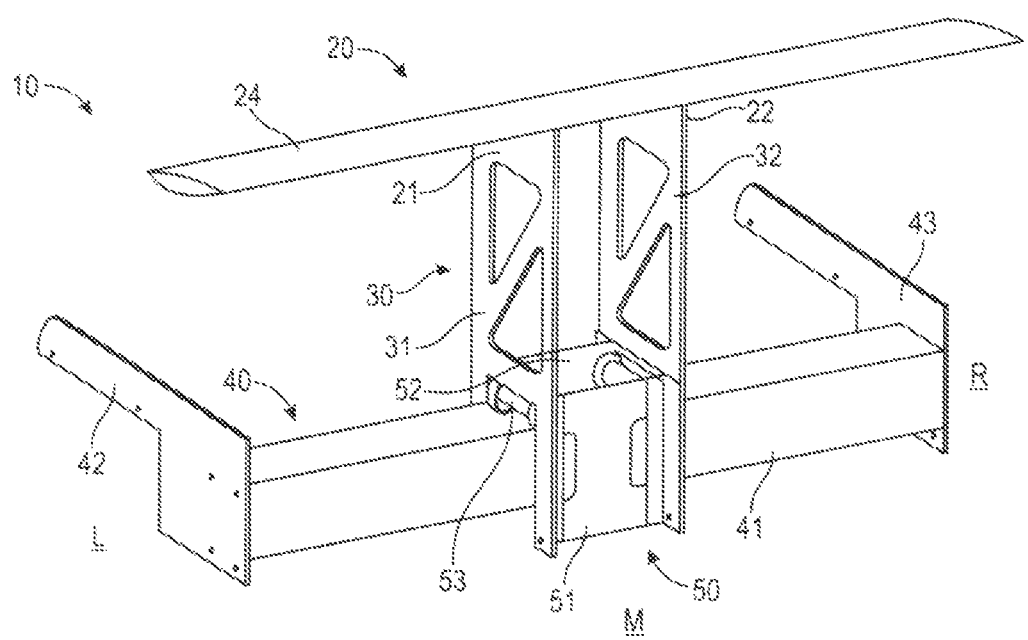
FIG. 1 is a rear perspective view of the movable wing/aerofoil assembly positioned in straight driving mode in accordance with a first preferred embodiment of the invention.

The following description will describe the invention in relation to preferred embodiments of the invention, namely a movable wing/aerofoil assembly. The invention is in no way limited to these preferred embodiments as they are purely to exemplify the invention only and that possible variations and modifications would be readily apparent without departing from the scope of the invention.

In motorsport (specifically, car racing), wings/aerofoils (and other similar means) are utilised is to create downforce, which increases tyre grip, specifically during acceleration and cornering when the grip is needed the most, for maximum traction, resulting in higher cornering speeds and lower lap times. Due to the exponential downforce: speed relationship, wings/aerofoils will create zero or very little downforce at low speeds and create too much downforce (and therefore also aerodynamic drag) at high speeds, so there is always a trade-off in wing/aerofoil design to try to get the most downforce possible at low-medium speeds (so that there is good cornering grip) but not too much drag at high speeds (which will limit high end acceleration, limit top speed, and increase fuel consumption, etc).

By moving the wing/aerofoil laterally on the vehicle as the vehicle is cornering, up to 100% of the downforce from that wing/aerofoil can be placed on the side of the vehicle which has less grip (due to weight-transfer during cornering). This can either be utilised to achieve twice the downforce where it is required (i.e. All downforce on one tyre instead of evenly split between both tyres), which is equivalent to having a much larger (and therefore heavier and higher-drag) wing/aerofoil, or alternatively, a wing/aerofoil that is much smaller (and therefore lighter and lower-drag) can be utilised, with similar results to a fixed-wing arrangement of larger size. For a numerical example, say a 1000 kg car is driving around a left-turn corner and the resultant weight transfer means there is 700 kg of load on the right wheels and only 300 kg on the left wheels. A stationary wing with 500 kg of downforce will result in tyre loads of 950 kg and 550 kg respectively (applying 250 kg to each side). By moving the wing position during cornering, it is possible to achieve loads on the tyres of 750 kg per side, and therefore the vehicle will be more balanced and safer to corner faster than when the tyres are unevenly loaded.

The principle concept that led to the invention is that during cornering, it would be desirable to be able to have more downforce on the inside wheels of a vehicle. As wings/aerofoils already create downforce—but when fixed in place the downforce is split 50:50 between both sides of the vehicle. The concept behind the invention was to enable the ratio to be altered from 100:0 to 0:100, for downforce where it is needed most during cornering. The further developed concept of having independent left and right-side moving wings/aerofoils came about from the application of the new mechanism while also addressing the problem of aerodynamic drag at higher speeds (by retracting the wings/aerofoils into the bodywork or out of the airflow during situations where low-drag is more important than downforce).

Turning now to the drawings where preferred embodiments of the invention will now be described. FIGS. 1 to 4 show a first embodiment of the invention where there is only a single transverse movable wing and FIGS. 5 to 8 show a second embodiment of the invention where there are two wings (left and right wings) able to move laterally.

FIGS. 1 to 4 show a movable wing assembly 10 having a single wing 20 capable of moving laterally (left or right) on a vehicle as the vehicle is being driven such the positioning of the wing 20 on the assembly 10 corresponds to the optimum or desired downforce required by the vehicle for the driving action undertaking by the vehicle at that time, e.g. if cornering to the left (FIG. 3) the wing 20 is positioned to the left L on the assembly 10 or if cornering to the right (FIG. 4) the wing 20 is positioned to the right R on the assembly 10 or if driving straight (FIGS. 1 & 2) the wing 20 is positioned midway M on the assembly 10.

The transverse moveable wing assembly 10 has a typical automotive-application inverted-wing 20 with a top surface 24 and a longer, curved lower surface that creates a suitable aerodynamic downforce action on the vehicle as it moves. The wing 20 is attached to a carriage 50 moveable mounted to a vehicle such that the wing 20 is able to move relative to the vehicle. The embodiments shown in the figures show a preferred wing/carriage attachment arrangement, however it is envisaged that other wing/carriage attachment arrangements can be utilised without departing from the scope of the invention such as singular, multiple or an assembly of supports connecting the wing to the carriage or the wing attached to the carriage directly or the wing and carriage are a unitary integral item. In FIGS. 1 to 4 is shown that the wing 20 is connected by downwardly extending spaced apart portions 21, 22 to upper respective ends of spaced apart beams 31, 32 of an upwardly extending support 30. The lower ends of the beams 31, 32 are connected to spaced apart endplates 51, 52 of a moveable carriage 50 situated on an elongate support 40 mountable to a vehicle via end plates 42, 43 on the ends of a beam 41. The wing assembly 10 is preferably positioned and mounted on a the rear of the vehicle in the region of the boot (trunk) such that the beam 41 is positioned to extend transversely across the vehicle whereby the end plate (or bracket) 42 is situated and mounted on the left hand side L of the vehicle and the end plate (or bracket) 43 is situated and mounted on the right hand side R of the vehicle, thus the longitudinal extent of the wing 20 extends transversely across the longitudinal extent of the vehicle. The moveable carriage 50 includes rollers 53 between the endplates 51, 52 so that the carriage 50 and thus the wing 20 are able to move left or right along the beam 41. The carriage 50 can be moved freely left or right along the beam under its own gravity and inertia corresponding to the action of the moving vehicle or can moved and controlled by use of weights and/or spring arrangements or can be moved and controlled by suitable driving mechanisms. In FIG. 2 there is shown a driving mechanism 60 including idler rollers 61, 62 and belts 64 that assist in moving the carriage 50 left or right along the beam 41. It is envisaged that the driving mechanism 60 is motorised, preferably by an electric motor controlled by a processor such that the speed and direction that the carriage 50 and thus the wing 20 moves is determined by information provided to the processor by way of sensors and preprogramed variables associated with what the vehicle is experiencing in respect of vehicle speed, lateral movement, acceleration, downward force, drag, tyre loading, etc as the vehicle is moving.

Figure 2:
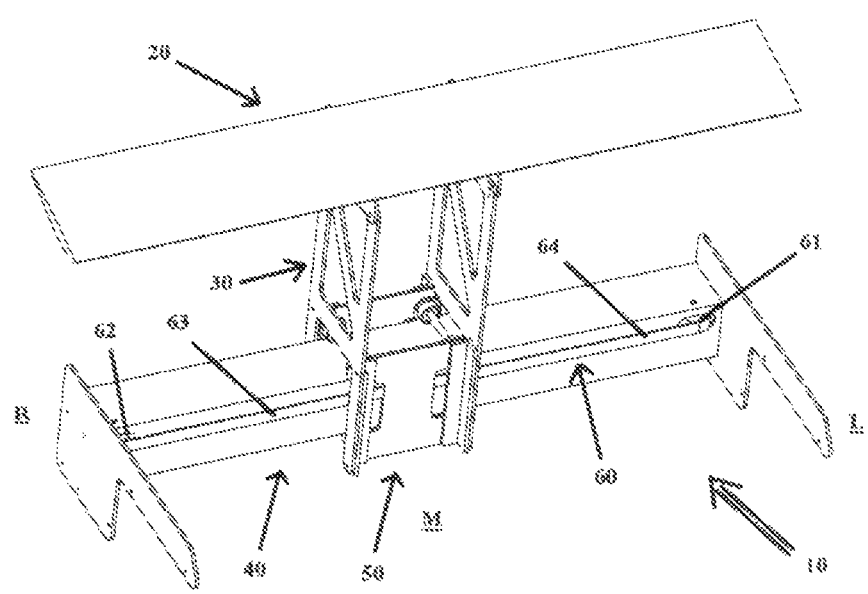
FIG. 2 is a front perspective view of the movable wing/aerofoil assembly as shown in FIG. 1.

FIGS. 1 and 2 shows the position of the wing 20 in a mid-position M on the beam 41. This mid-positioning M of the wing 20 corresponds to when the vehicle is either in a stationary mode or when being driven straight.

Figure 3:
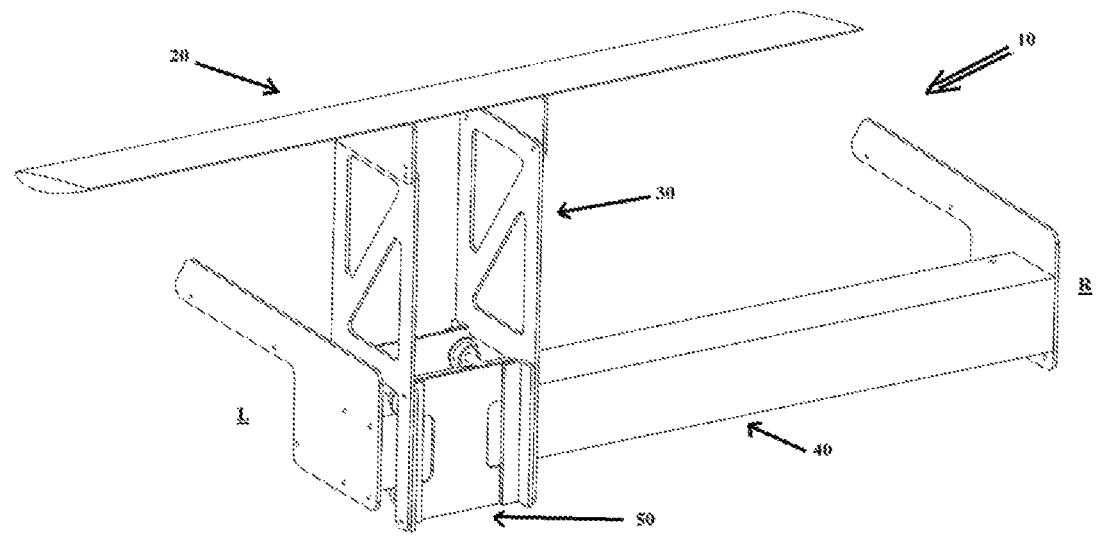
FIG. 3 is a rear perspective view of the movable wing/aerofoil assembly positioned in left turning mode in accordance with a first preferred embodiment of the invention.
Figure 4:
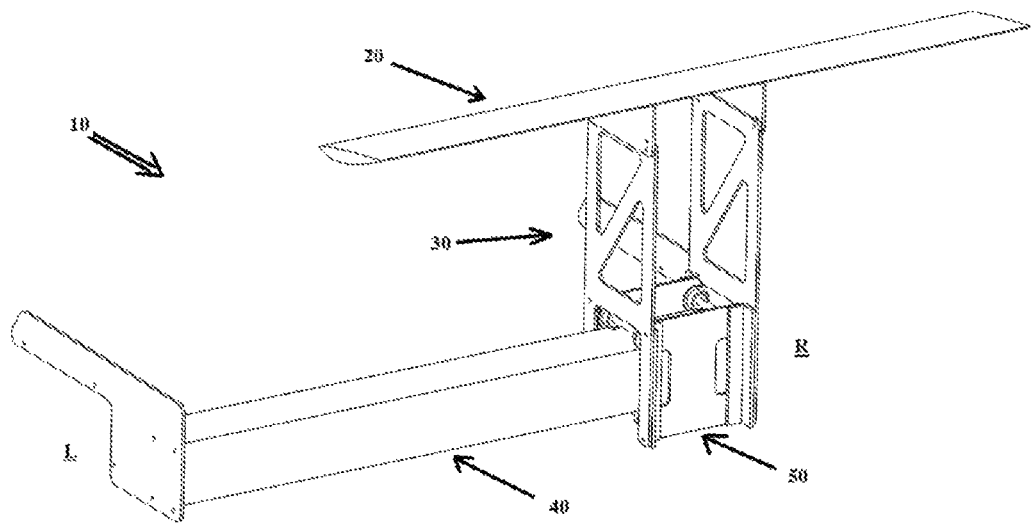
FIG. 4 is a rear perspective view of the movable wing/aerofoil assembly positioned in right turning mode in accordance with a first preferred embodiment of the invention.

When the vehicle is cornering the wing 20 moves along the beam in the direction of corning i.e. if the vehicle is corning to the left then the wing moves along the beam to the left L (as shown in FIG. 3) and when moving to the right the wing 20 moves along to the beam to the right L (as shown in FIG. 4).

As mentioned the beam 41 is mounted to the vehicle and upon which a carriage 50 can move and the wing 20 is attached to the carriage 50 and the carriage 50 can be actuated by a driving mechanism that can include and actuator such as an electric motor, pneumatics, hydraulics, or other known methods. The actuation may be direct, or via rods, linkages, drive belts, or other mechanisms. The carriage 50 movement can be electronically controlled, manually controlled, or controlled by other methods such as utilising the movement of the vehicle. The carriage 50 may move on bearings, rollers, sliders, magnetic levitation, or other such means to allow the wing 20 to move from one position to another. The actuator can be controlled by a processor and/or programmable software, etc.

As a further option for the invention, the transverse-moveable wing 20 can be initially placed within the vehicle bodywork or simply out of the airflow (such as behind the vehicle or within the boot/trunk space), such that when the wing is out of the airflow, there can be zero or low drag for high speed and efficiency, and then the wing 20 can be progressively moved outward into the airflow when required for an adjustable amount of downforce. The wing/aerofoil assembly could be used and mounted anywhere on the vehicle, such as the front, top, rear, underneath or sides of the vehicle, as long as the wing/aerofoil is positonable (either permanently or raised from a stowed position) within the airflow of the moving vehicle.

The longitudinal length of wing/aerofoil can be extended so that the longitudinal length of the wing/aerofoil when fully extended is greater than the width of the vehicle such that portions of the wing/aerofoil are positionable within the airflow passing along the side of the moving vehicle.

FIGS. 5 to 8 show a movable wing assembly 100 having a twin wings 200L, 200R capable of moving laterally (left or right) on a vehicle as the vehicle is being driven such the positioning of the wings 200L, 200R on the assembly 100 corresponds to the optimum or desired downforce required by the vehicle for the driving action undertaking by the vehicle at that time, e.g. if cornering to the left (FIG. 7) the wings 200L, 200R is positioned to the left L on the assembly 100 or if cornering to the right (FIG. 8) the wings 200L, 200R is positioned to the right R on the assembly 100 or if driving straight with low downward force mode (FIG. 5) the wings 200L, 200R are positioned midway M on the assembly 100 or if driving straight with full downward force mode (FIG. 6) the wing 200L is positioned to the left L on the assembly 100 and the wing 200R is positioned to the right R on the assembly 100.

Figure 5:
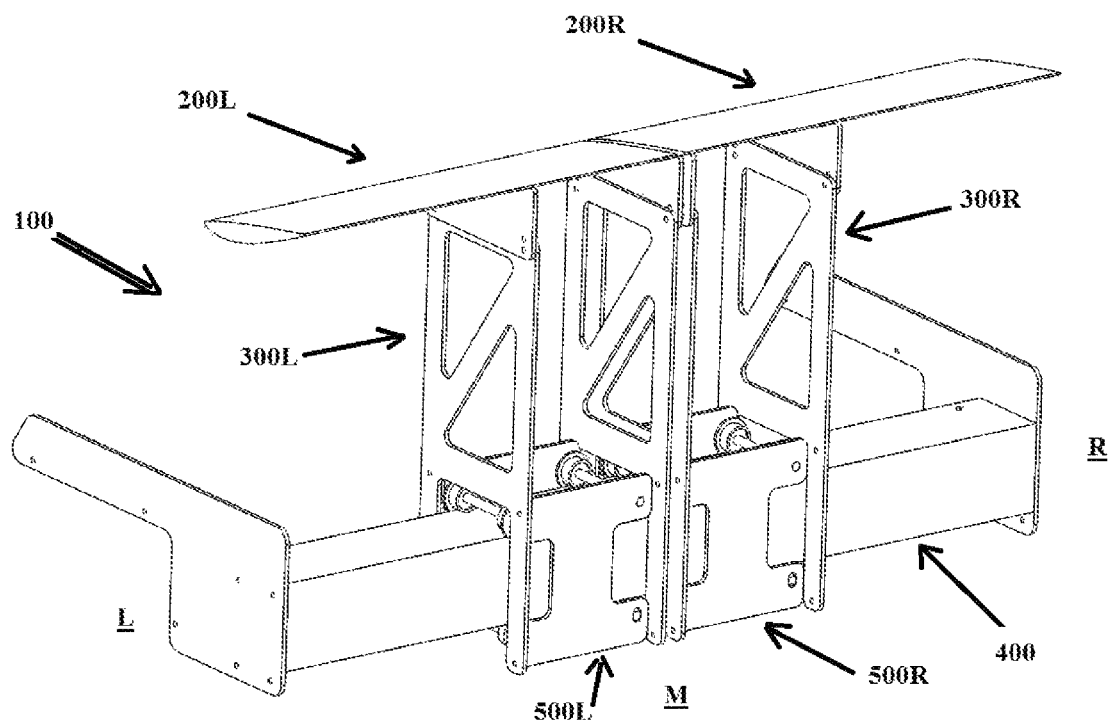
FIG. 5 is a rear perspective view of the movable wing/aerofoil assembly positioned in low down force straight driving mode in accordance with a second preferred embodiment of the invention.
Figure 6:
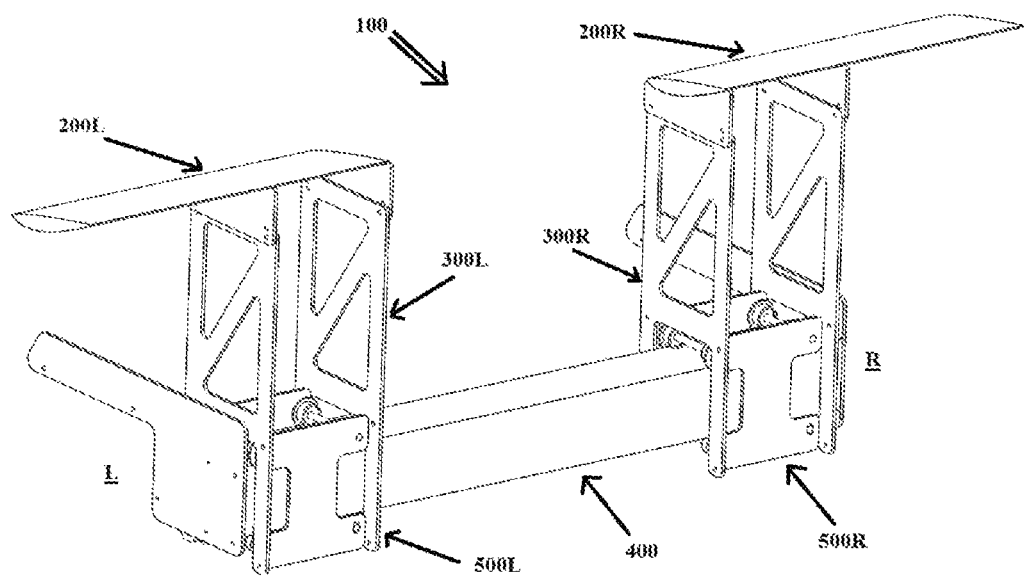
FIG. 6 is a rear perspective view of the movable wing/aerofoil assembly positioned in full down force straight driving mode in accordance with a second preferred embodiment of the invention.
Figure 7:
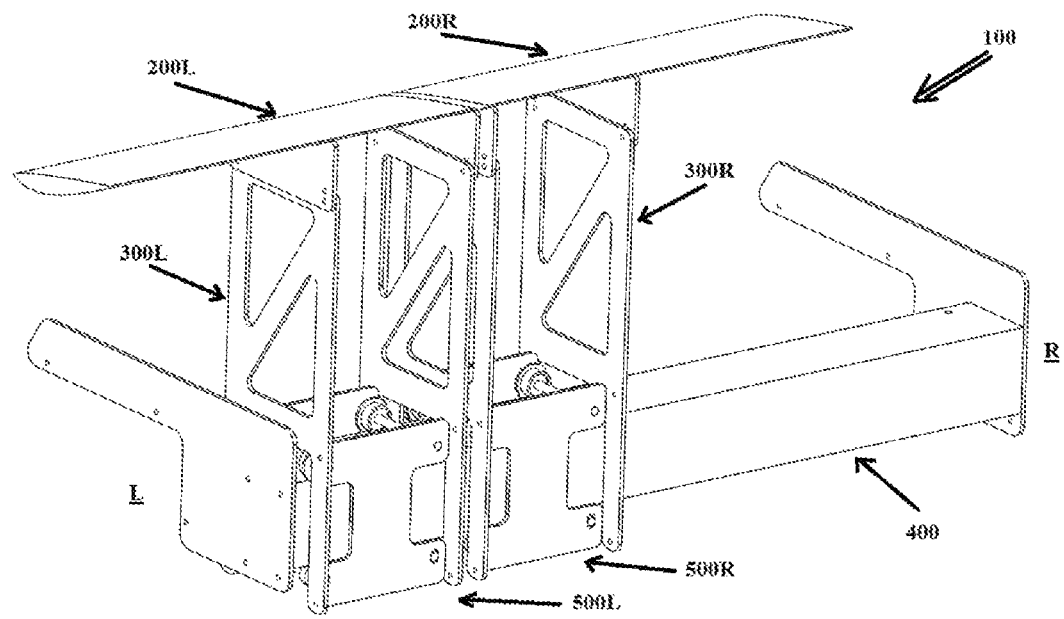
FIG. 7 is a rear perspective view of the movable wing/aerofoil assembly positioned in left turning mode in accordance with a second preferred embodiment of the invention.
Figure 8:
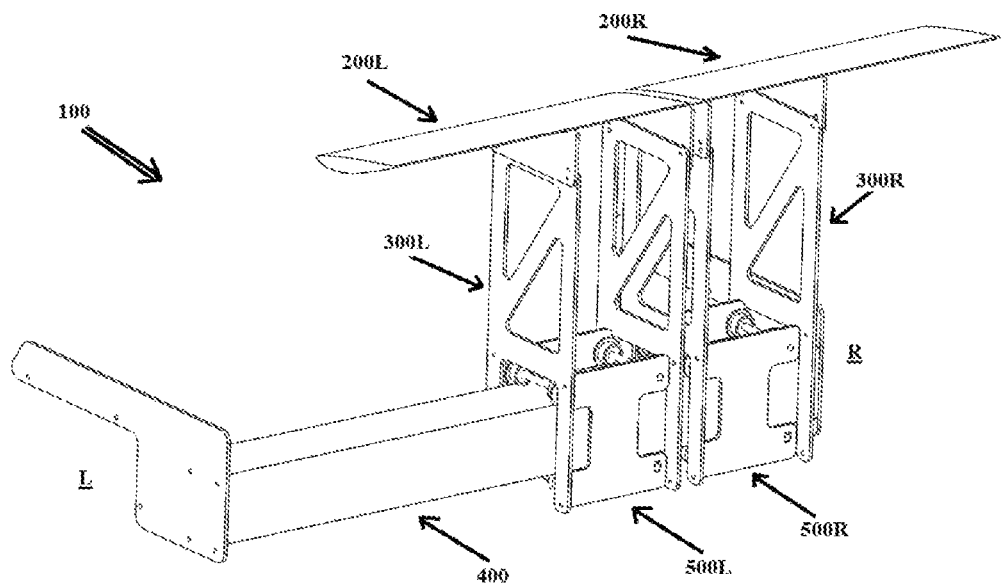
FIG. 8 is a rear perspective view of the movable wing/aerofoil assembly positioned in right turning mode in accordance with a second preferred embodiment of the invention.

The transverse moveable wing assembly 100 has each wing 200L, 200R connected the upper portions of respective corresponding upwardly extending supports 300L, 300R. The lower portions of the supports 300L, 300R are connected to respective corresponding carriages 500L, 500R. The carriages 500L, 500R are able to move laterally along (left or right) elongate support 400 mountable to a vehicle via end plates on the ends of a beam. The wings 200L, 200R are able to move left or right in unison (as shown in FIGS. 5, 7 and 8) or are able to move independently relative to the other (as shown in FIG. 6). By having independently moving wings 200L, 200R can result to give anything from zero downforce (at any speed), to varying downforce one side of the vehicle only, to varying levels of downforce on both sides of the vehicle if desired.

FIG. 5 shows the position of the wings 200L, 200R in a mid-position M on the elongate support 400. This mid-positioning M of the wings 200L, 200R corresponds to when the vehicle is in a stationary mode or when been driven corresponds to the vehicle is driving straight and requiring a low downward force mode.

FIG. 6 shows the position of the wings 200L, 200R spaced apart from one another on the beam 400, where wing 200L is positioned to the left L and wing 200R is positioned to the right R. The wings 200L, 200R when in this position correspond to when the vehicle is been driven straight and requiring a high downward force mode.

When the vehicle is cornering the wings 200L, 200R move as required along the beam 400 in the direction of corning i.e. if the vehicle is corning to the left then the wings 200L, 200R moves along the beam to the left L (as shown in FIG. 7) and when moving to the right the wings 200L, 200R move along to the elongate support 400 to the right L (as shown in FIG. 8).

In FIGS. 3, 4, 6, 7, and 8 it is shown having the wings extended along the beam fully to the left (FIGS. 3 & 7) or fully to the right (FIGS. 4 & 8) or fully to both left and right (FIG. 6). However the wing can be moved to any location along the beam, not necessarily fully to the left to fully to the right or at the centre. The wing is able to be situated along the beam that corresponds to the optimal position for the wing to provide the optimum or desired downforce required by the vehicle for the driving action undertaking by the vehicle at that time.

Distinguishing Features:

Wing/aerofoil can be moved side-to-side.

Wing/aerofoil can be a single unit mounted in (or out of) the airflow, or can be two independent units mounted partially/fully in/out of the airflow, to adjust how much downforce is created (by moving the wing/aerofoil further into or out of the airflow).

The wings/aerofoils can be either controlled electrically or by other known means, or can also be self-controlled using weights which move due to the g-forces experienced by the vehicle (i.e. During cornering the weight moves to the outside of the vehicle and is attached to a mechanism which moves the wing/aerofoil in the opposite direction to the inside of the vehicle, where it is desired to have it during that moment). Or there can be a combination of the above methods to control the wing/aerofoil position.

A benefit of moving a wing/aerofoil laterally compared to changing the angle, is that the downforce is directly transferred through the bracket into the frame, as the actuation mechanism doesn't support the mechanical load from the downforce. Another commercial aspect is that the system can be applied with a wide range of existing wing/aerofoil designs, rather than needing a specific wing/aerofoil to be included with the system.

Alternatives could be any device used in motorsport to move the location where downforce is created. Further, the same invention could be used for moving weights on/in a vehicle, to shift the centre of gravity of the vehicle and improve its performance (often race cars are under class weight limits, so need to add ballast, so a device such as this is very feasible, as it would not be the usual trade-off associated with adding extra weight to a racing vehicle). Motorsport and race vehicles are mentioned above, but the invention could be utilised in any vehicles such as this is very feasible, such as OEM road going cars or trucks, etc, or as an aftermarket product where the applications are endless (also including [but not limited to] water craft, air craft, and other vehicles)

EQUIVALENTS CLAUSE

The invention may also broadly be said to consist in the parts, elements and features referred or indicated in the specification, individually or collectively, and any or all combinations of any of two or more parts, elements, members or features and where specific integers are mentioned herein which have known equivalents such equivalents are deemed to be incorporated herein as if individually set forth.

The examples and the particular proportions set forth are intended to be illustrative only and are thus non-limiting.

VARIATIONS

The invention has been described with particular reference to certain embodiments thereof. It will be understood that various modifications can be made to the above-mentioned embodiment without departing from the ambit of the invention. The skilled reader will also understand the concept of what is meant by purposive construction.

The invention claimed is:

1. A movable wing/aerofoil assembly for shifting where and how much downforce is exerted on a moving vehicle, the moveable wing/aerofoil assembly includes:
   a) a wing/aerofoil;
   b) a carriage connected to and supporting the wing/aerofoil; and
   c) a carriage support adapted to allow the carriage to move along the carriage support, the carriage support is mounted and positioned on a vehicle such that the carriage is able to move laterally relative to the longitudinal extent of the vehicle,
wherein the movable wing/aerofoil assembly allows the wing/aerofoil to move laterally relative to the vehicle as the vehicle is being driven such that the lateral movement and positioning of the wing/aerofoil on the vehicle corresponds to the optimum or desired aerodynamic downforce required by the moving vehicle and allows for the dynamic adjustment of the position and magnitude of aerodynamic downforce applied to the vehicle relative to the direction the vehicle is moving.

2. A movable wing/aerofoil assembly for shifting where and how much downforce is exerted on a moving vehicle, the moveable wing/aerofoil assembly is mounted to a vehicle and includes:
   a) a wing/aerofoil; and
   b) a moveable carriage connected to and supporting the wing/aerofoil, the moveable carriage is adapted to move laterally relative to the longitudinal extent of the vehicle;
wherein the movable wing/aerofoil assembly allows the wing/aerofoil to move laterally relative to the vehicle as the vehicle is being driven such that the lateral movement and positioning of the wing/aerofoil on the on the vehicle assembly corresponds to the optimum or desired aerodynamic downforce required by the moving vehicle and allows for the dynamic adjustment of the position and magnitude of aerodynamic downforce applied to the vehicle relative to the direction the vehicle is moving.

3. The moveable wing/aerofoil assembly as claimed in claim 2, wherein the wing/aerofoil is spaced and supported a distance above the carriage.

4. The moveable wing/aerofoil assembly as claimed in claim 3, wherein the moveable wing/aerofoil assembly is mounted at and above a rear of the vehicle such that the wing/aerofoil is spaced a distance above the rear of the vehicle so that airflow can be directed over and under the wing/aerofoil as the vehicle moves in order to apply aerodynamic downforce to the moving vehicle.

5. The moveable wing/aerofoil assembly as claimed in claim 3, wherein the moveable wing/aerofoil assembly is mounted to and above a boot portion of the vehicle.

6. The moveable wing/aerofoil assembly as claimed in claim 5, wherein the carriage is adapted to move freely laterally under the carriages own gravity and inertia corresponding to the action of the moving vehicle.

7. The moveable wing/aerofoil assembly as claimed in claim 5, wherein the carriage is adapted to move by way of a drive mechanism that in order to control the direction and speed of the carriage corresponding to action of the moving vehicle.

8. The moveable wing/aerofoil assembly as claimed in claim 7, wherein the wing/aerofoil includes a left portion and a right portion where each portion is able to move independently to the other portion.

9. The moveable wing/aerofoil assembly as claimed in claim 8, wherein the carriage includes a left carriage portion and a right carriage portion where each portion is able to move independently to other portion, the left carriage portion is connected to and supports the left portion of the wing/aerofoil and the right carriage portion is connected to and supports the right portion of the wing/aerofoil.

10. A method for shifting where and how much downforce is applied and exerted to a moving vehicle by a movable wing/aerofoil assembly, the method includes:
   a) mounting a moveable wing/aerofoil assembly;
   b) positioning the wing/aerofoil in a mid-position on the moveable wing/aerofoil assembly such that the wing/aerofoil is centred on and above the vehicle when the vehicle is stationary and moving in a straight direction;
   c) moving the wing/aerofoil laterally to the left of the mid position when the vehicle is cornering to the left; and
   d) moving the wing/aerofoil laterally to the right of the mid position when the vehicle is cornering to the right, wherein the movement and position of the wing/aerofoil on the vehicle corresponds to the optimum or desired aerodynamic downforce required by the moving vehicle and to allow for the dynamic adjustment of the position and magnitude of aerodynamic downforce applied to the vehicle relative to the direction the vehicle is moving.

11. A movable wing/aerofoil assembly for shifting where and how much downforce is exerted on a moving vehicle, the wing/aerofoil assembly is mounted to a vehicle and includes:
  a) a left wing/aerofoil and a right wing/aerofoil; and
  b) a left carriage and a right carriage, the left carriage connected to and supporting the left wing/aerofoil and the right carriage connected to and supporting the right wing/aerofoil and the right carriage, the carriages are adapted to move laterally relative to the longitudinal extent of the vehicle, the carriages are adapted and capable of moving in unison in the same laterally direction and are adapted and capable of moving independently and in opposite lateral directions;
wherein the movable wing/aerofoil assembly allows the wing/aerofoils to move laterally relative to the vehicle as the vehicle is being driven such that the lateral movement and positioning of the wing/aerofoils on the vehicle corresponds to the optimum or desired aerodynamic downforce required by the moving vehicle and allows for the dynamic adjustment of the position and magnitude of aerodynamic downforce applied to the vehicle relative to the direction the vehicle is moving.

12. A method for shifting where and how much downforce is applied and exerted to a moving vehicle by a movable wing/aerofoil assembly, the method includes:
  a) mounting the moveable wing/aerofoil assembly;
  b) positioning the wing/aerofoils in a mid-position on the moveable wing/aerofoil assembly such that the wing/aerofoils are centred on and above a vehicle when the vehicle is stationary and moving in a straight direction;
  c) positioning one of the wing/aerofoils fully to a left of the mid position and positioning the other wing/aerofoil fully to a right of the mid when the vehicle moving in a straight direction and when full aerodynamic downforce mode is required;
  d) moving a left wing/aerofoil laterally to the left of the mid position and keeping the right wing/foil in the mid position when the vehicle is cornering to the left; and
  e) moving a right wing/aerofoil laterally to the right of the mid position and keeping the left wing/aerofoil in the mid position when the vehicle is cornering to the right,
wherein the movement and position of the wing/aerofoils on the vehicle corresponds to the optimum or desired aerodynamic downforce required by the moving vehicle and to allow for the dynamic adjustment of the position and magnitude of aerodynamic downforce applied to the vehicle relative to the direction the vehicle is moving.

13. The moveable wing/aerofoil assembly as claimed in claim 12, wherein the moveable wing/aerofoil assembly is adapted to be moved in and out of the airflow of a moving vehicle such that when zero or low drag for high speed and efficiency is required the moveable wing/aerofoil assembly is moved out of the airflow of a moving vehicle and when an adjustable amount of downforce is required the wing/aerofoil is moved progressively into the airflow of the moving vehicle.

14. The moveable wing/aerofoil assembly as claimed in claim 13, wherein the moveable wing/aerofoil assembly can be mounted at and on any location on the vehicle such that the wing/aerofoil is positionable within the airflow of the moving vehicle.

15. The moveable wing/aerofoil assembly as claimed in claim 13, wherein a longitudinal length of wing/aerofoil can be extended so that the longitudinal length of the wing/aerofoil when fully extended is greater than the width of the vehicle such that portions of the wing/aerofoil are positionable within the airflow passing along the side of the moving vehicle.

* * * * *